United States Patent [19]

Schafsteller

[11] Patent Number: 4,608,654
[45] Date of Patent: Aug. 26, 1986

[54] LINEAR POSITION INDICATOR

[75] Inventor: Helmut Schafsteller, Ambler, Pa.

[73] Assignee: The Warner & Swasey Company, Cleveland, Ohio

[21] Appl. No.: 561,014

[22] Filed: Dec. 13, 1983

[51] Int. Cl.[4] .................. G06F 15/46; G05B 11/18
[52] U.S. Cl. ................................. 364/559; 364/167; 318/594
[58] Field of Search .............. 364/559, 167; 318/594, 318/599, 469, 466; 377/15, 17, 24

[56] References Cited

U.S. PATENT DOCUMENTS

| | | | |
|---|---|---|---|
| 4,094,371 | 6/1978 | Ferrell | 377/17 X |
| 4,203,064 | 5/1980 | Suzuki et al. | 364/559 X |
| 4,312,033 | 1/1982 | Sweeney et al. | 364/167 |
| 4,353,019 | 10/1982 | Sweeney | 318/594 |
| 4,392,195 | 7/1983 | Inoue | 364/167 |
| 4,404,626 | 9/1983 | Aoyama | 364/167 X |
| 4,410,951 | 10/1983 | Nakamura et al. | 364/559 |
| 4,437,151 | 3/1984 | Hurt et al. | 364/559 X |
| 4,499,541 | 2/1985 | Yuki et al. | 377/17 X |
| 4,509,126 | 4/1985 | Olig et al. | 364/167 X |

Primary Examiner—Edward J. Wise
Attorney, Agent, or Firm—H. K. Massung; J. R. Benefiel; R. J. Eifler

[57] ABSTRACT

A linear position indicating system utilizing a fixed chain (20) which engages a pinion (32) connected to a mechanical input of an encoder (26) for providing position information. Encoder (26), supported on a relatively movable cross slide (14), provides an output signal indicative of the position of crosslide (14) relative to member (12) from which it is supported. Idlers (34, 36) are provided to guide the chain (20) around pinion (32) to ensure a large contact of approximately 180°. Proximity switches (50, 52) are disposed for detecting when crosslide (14) is near its travel limits. The distance between switches (50, 52) is adjustable so they can be set at a precise separation. A counter (72) is provided for counting pulses as crosslide (14) moves between switches (50, 52). The output of counter (72) is used along with the know separation between switches (51, 52) for calibrating the output of encoder (26).

14 Claims, 12 Drawing Figures

LINEAR POSITION INDICATOR

BACKGROUND OF THE INVENTION

1. Technical Field:

This invention relates to machine tools and more particularly to an inexpensive precision linear position indicator system.

2. Background Art

Linear position indicating devices are necessary for providing the feedback signals required to synchronize the absolute position of X-Y positioning tables or other mechanical positioners to their associated electronic controls. One type of position indicators are linear resolvers such as scales supplied by Farrand or Sony. A second type of indicator uses angular resolvers or encoders that more easily interface with microprocessor type controls. In smaller positioning devices, it is customary to mount the feedback device directly to the motor drive. The drive motor in turn positions the X-Y table via a precision rack and pinion or lead screw drive. On larger tables with increasing table size and weight this approach becomes increasingly expensive and impractical and it is customary to separate the drive from the linear position feedback device.

DISCLOSURE OF THE INVENTION

The present invention provides a linear position indicating device which is particularly suitable for heavy machine tool applications. A standard mass produced chain is mounted to a first member and is disposed to drive an encoder supported on a second relatively movable member. The sprocket or pinion gear on the mechanical input shaft of the encoder engages the chain and provides a position indication as the two members move. Chain guide idlers are provided causing the chain to wrap around approximately 180° of the sprocket or pinion. This prevents jumping teeth and slipping between the chain and pinion. Also manufacturing tolerances between adjacent pitches in both the chain and the pinion are averaged over approximately 180° of the pinion.

Limit switches are provided near the ends of travel of the movable members for detecting one of the movable members. The limit switch separation is accurately set. The movable member is moved between the accurately located limit switches for calibrating the position encoder.

BRIEF DESCRIPTION OF THE DRAWINGS

For a better understanding of the invention, reference may be had to the preferred embodiment exemplary thereof shown in the accompanying drawings in which.

BEST MODE FOR CARRYING OUT THE INVENTION

Figure 1:
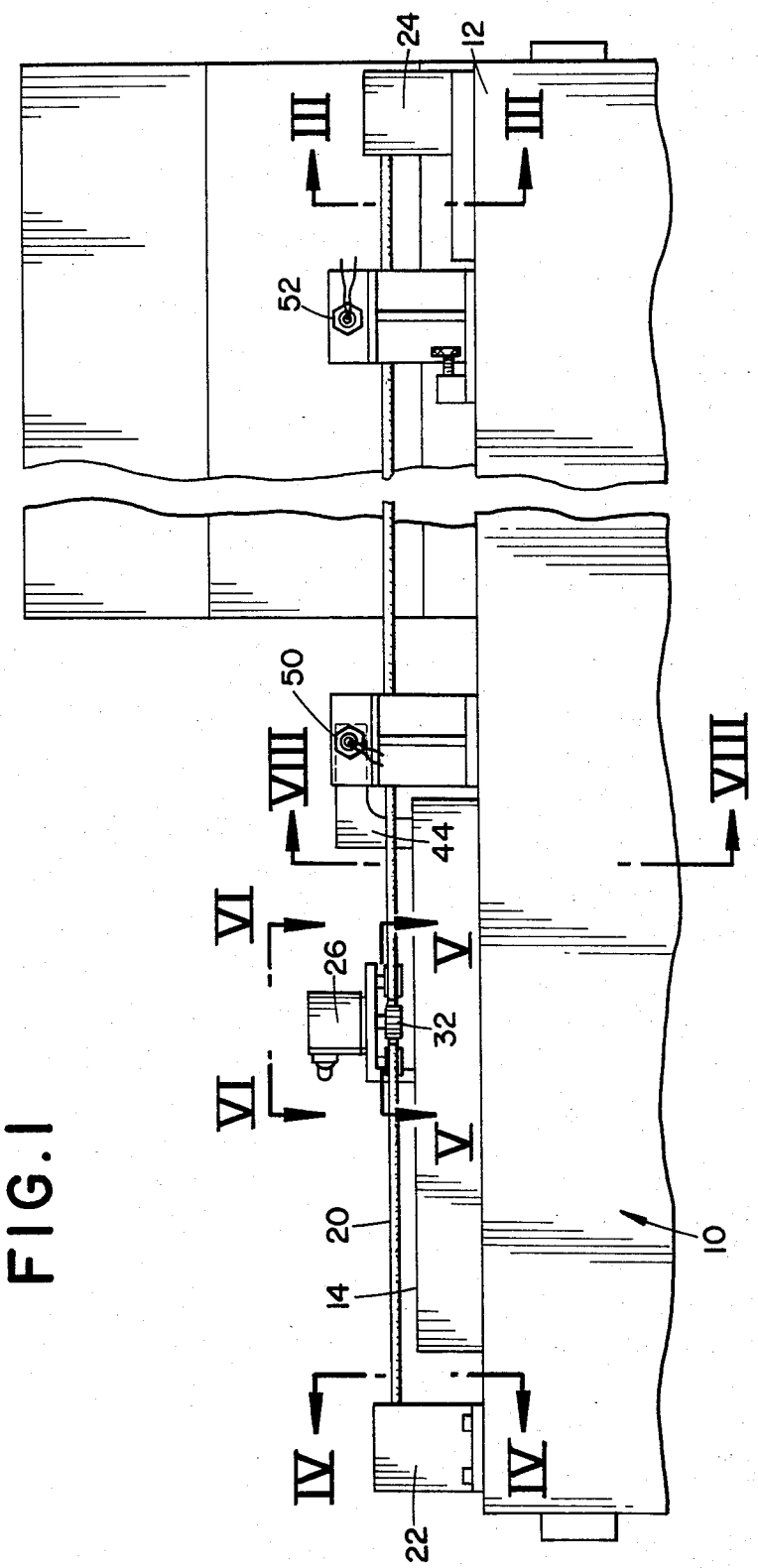
FIG. 1 is a front view of a machine tool utilizing teaching of the present invention.

Referring now to the drawings there is shown a machine tool 10 which utilizes the present invention. A carriage 12 is supported on machine tool 10 for movement in a first or Y-axis direction. A cross slide 14 is supported for movement on carriage 12 in a second or X-axis, direction perpendicular to the first direction of movement of carriage 12. Sheet metal grippers 16 are provided on cross slide 14 for gripping a sheet metal workpiece 18. Carriage 12 and cross slide 14 are movable simultaneously under the control of an electronic controller for two axis positioning of the sheet metal workpiece 18.

A chain 20, Model No. 16GCF which is commercially available from Winfred M. Berg Inc., 499 Ocean Ave., East Rockaway, Long Island, N.Y. 11518, extends in the X-axis between supports 22 and 24 which are secured to carriage 12. Ladder chain 20 extends between supports 22 and 24 and is attached thereto by suitable fasteners.

An encoder 26 which is supplied by BEI Electronics, Inc. 7230 Hollister Avenue, Golsta, CA 93117, Model Number H25-E-5B-1000-ABZ-7406-5-M16, is supported from cross slide 14. Encoder 26 has a mechanical input 28 and provides an electrical output signal which is a function of the angular position of mechanical input 28. The electrical output information from encoder 26 indicates the position of cross slide 14. Encoder 26 provides three separate pulse outputs which, for further reference, are called A, B and C pulses. There are 1000 A and 1000 B pulses generated for each encoder revolution. The A and B pulses are shifted by 90° from each other. There is one C pulse generated for each encoder revolution.

A sprocket or pinion 32 Model No. 16B8-20 from Winfred M. Berg Inc., is attached to the mechanical input 28 of encoder 26. Sprocket 32 engages chain 20 to rotate the mechanical input shaft 28 of encoder 26 as cross slide 14 moves along carriage 12. A pair of idler or guide sprockets 34 and 36 guide chain 20 around sprocket 32. Guide idlers 34 and 36 cause chain 20 to engage approximately 180° of pinion 32.

The electrical output of encoder 26 provides a feedback signal for synchronizing the positioning of cross slide 14 for X-axis positioning of the gripped sheet metal workpiece 18. A similar chain and encoder arrangement is provided for supplying position information for relative movement between carriage 12 and the base of machine tool 10 to indicate the Y-axis position of the sheet metal workpiece 18.

The standard mass produced chain 20 is mounted to drive a relatively stationary encoder in a manner similar to a normal rack and pinion drive. Chain 20 wraps around approximately one half or 180° of the periphery of the pinion 32. This construction has the advantage that any manufacturing tolerance between adjacent pitches in either the chain 20 or pinion 32 are averaged over approximately 180° of pinion 32 to an average, high precision. Jumping teeth between the chain 20 and pinion 32 is eliminated and the slippage or backlash is reduced to the difference in pitch diameters of chain 20 and pinion 32 to a measured 0.002 linear inches. The total load on each chain sprocket, with its consequent bowing and inaccuracies, is very much reduced by averaging the total load over the 180° wraparound. Also, the feedback package is independent of the table weight and can be implemented over large linear distances.

Figure 2:
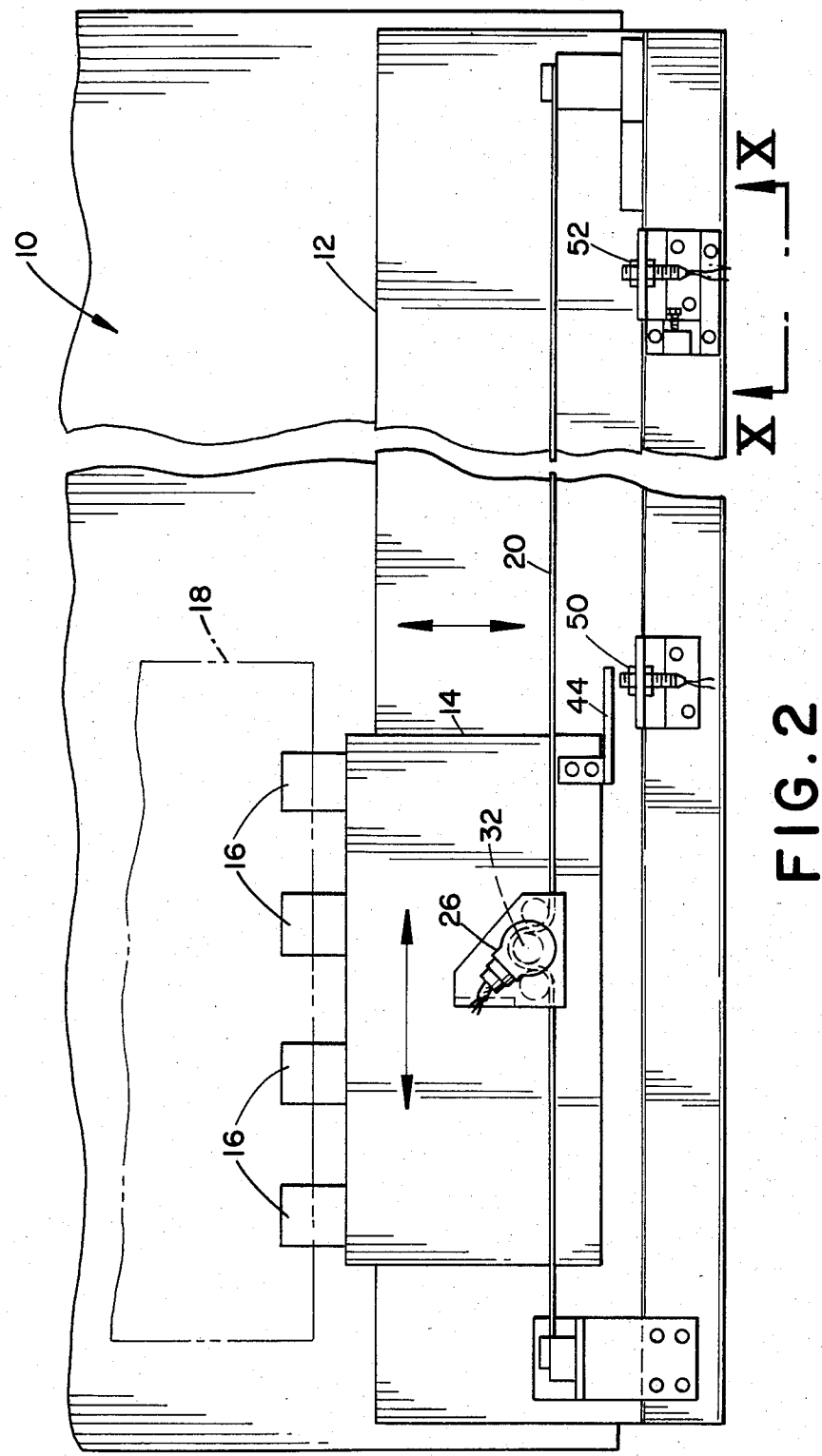
FIG. 2 is a plane view of the machine tool shown in FIG. 1.
Figure 3:
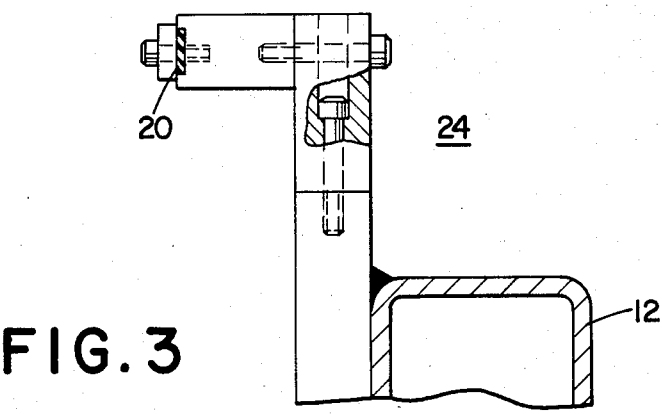
FIG. 3 is a view taken in FIG. 1 along the line III—III.
Figure 4:
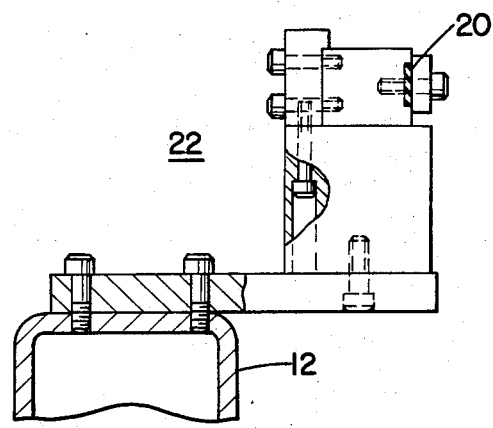
FIG. 4 is a view taken in FIG. 1 along the line IV—IV.
Figure 5:
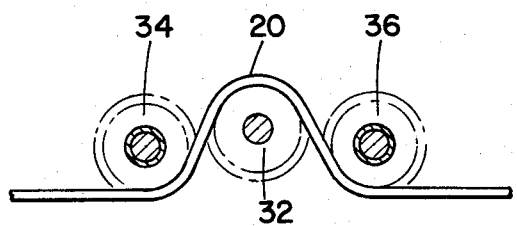
FIG. 5 is a view taken in FIG. 1 along the line V—V.
Figure 6:
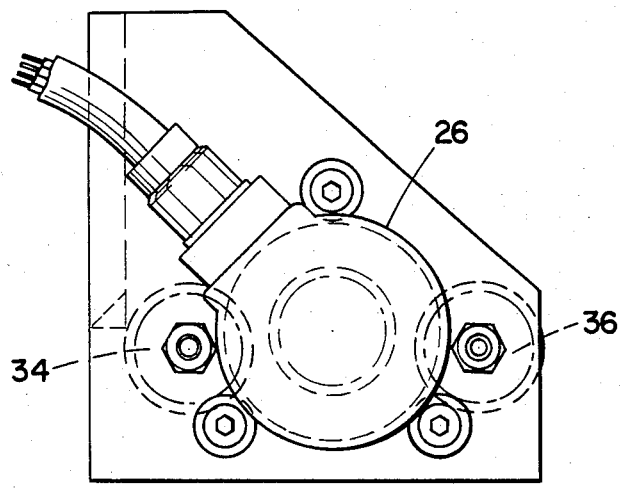
FIG. 6 is a view taken in FIG. 1 along the line VI—VI.
Figure 7:
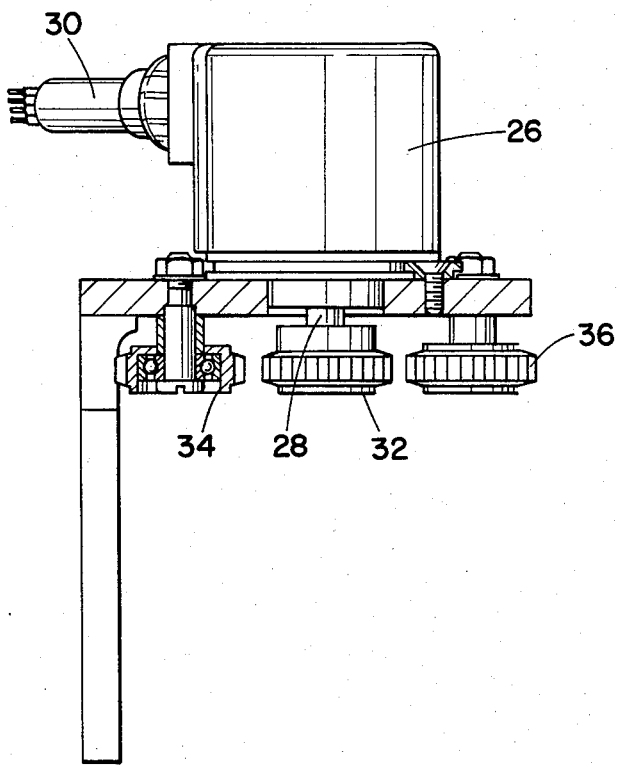
FIG. 7 is a front view of FIG. 6.
Figure 8:
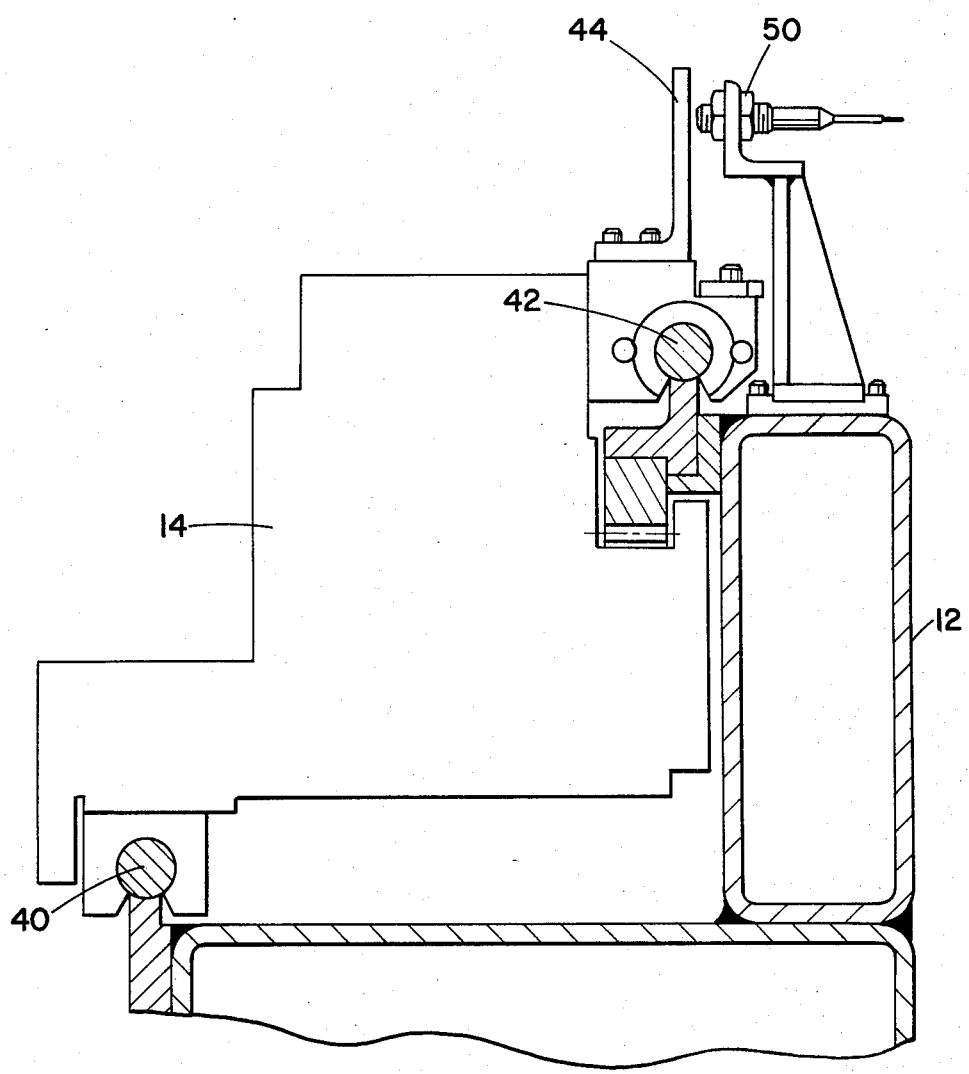
FIG. 8 is a view taken in FIG. 1 along the line of VIII—VIII.
Figure 9:
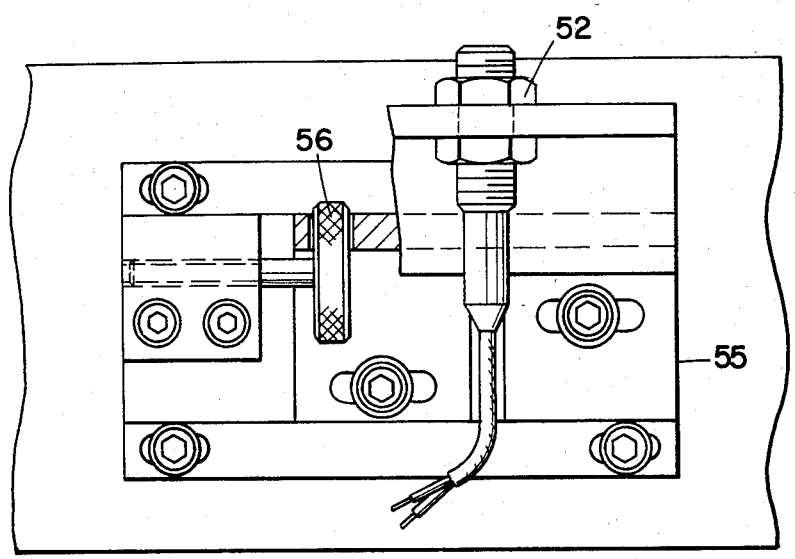
FIG. 9 is a front view of FIG. 10.
Figure 10:
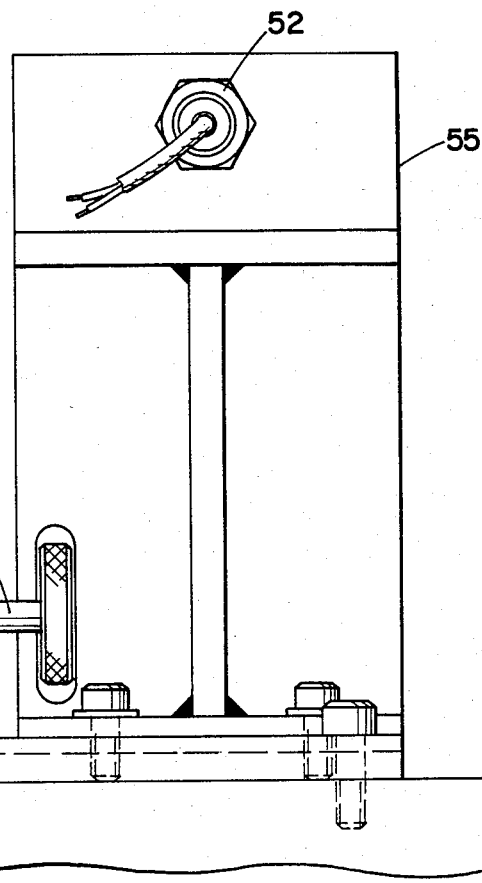
FIG. 10 is a view taken in FIG. 8 along the line of X—X.

As shown in FIGS. 8 thru 10 cross slide 14 is supported by suitable round ways 40 and 42 from carriage 12. A suitable drive (not shown) is provided for moving cross slide 14 across carriage 12 in response to a controller. Cross slide 14 is movable on carriage 12 as shown in FIG. 2 between a left hand position and a right hand position. A flag member 44 is provided on cross slide 12. A calibration range proximity switch 50 is provided for detecting flag member 44 when cross slide 14 is approaching the left hand position. A calibration zero proximity switch 52 is provided for detecting flag member 44 when cross slide 14 is approaching the right hand position. Suitable adjustments are provided for accurately adjusting the separation of proximity switches 50 and 52.

As shown in FIGS. 9 and 10 the bracket which supports proximity switch 52 is attached to the cross slide 14 by bolts which extend through slotted openings. When the bolts securing bracket 55 to cross slide 14 are loosened the position of the bracket 55 can be accurately adjusted by the screw adjusting member 56. The separation from proximity switch 50 and proximity switch 52 can thus be set with a high degree of accuracy. The distance between these two proximity switches 50, 52 can then be used for calibrating encoder 26.

A position indicating system of the type described requires an initial one time zeroing cycle to synchronize the absolute mechanical position with the electronic control circuit. With the disclosed position feedback indicator, the zeroing cycle should be expanded to add a range cycle for calibrating encoder 26. It should be recognized that, although combined, the purpose and function of the zero and range cycles are different.

Figure 11:
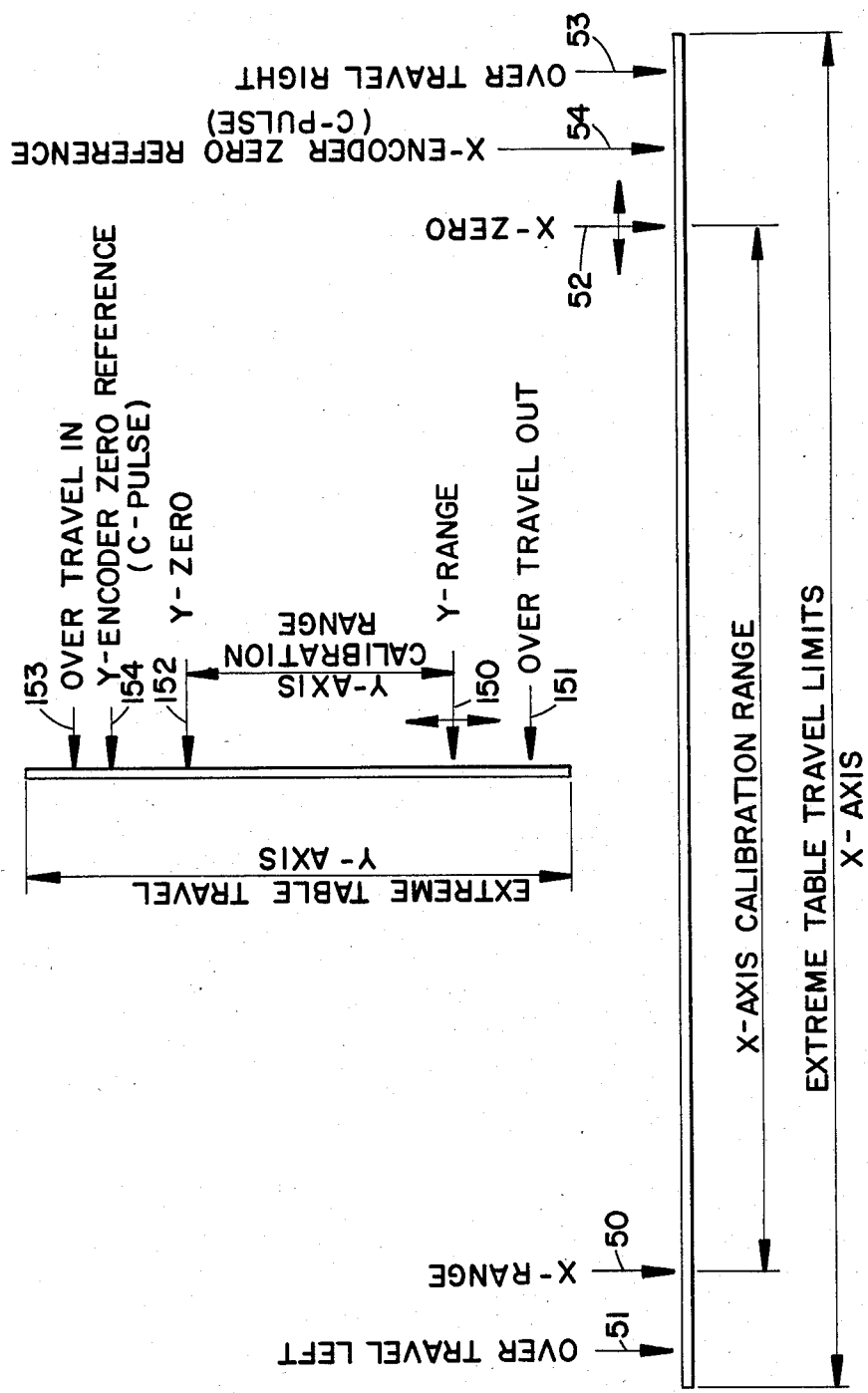
FIG. 11 is a diagramatic illustration of table travel showing locations of various switches on the X-axis and Y-axis.

FIG. 11 shows the location of various switches for the X-axis movememt of cross slide 14 along carriage 12 and for the Y-axis movement of carriage 12 along the base of machine tool 10. The position feedback indicator for positioning on the Y-axis is similar operation to the indicator use along the X-axis. A Y-axis calibration range switch 150 is provided and a Y-axis zero calibration switch 152 is also provided. The distance between switches 150 and 152 is adjustable to provide the high precision separation which can be used for calibrating the Y-axis encoder. Movement along the X-axis and Y-axis can be simultaneous during calibration and machine operation. An electronic controller of the type known in the art can be programmed to control operation of machine tool 10. The controller can control calibration and zeroing cycles for encoder 26.

Figure 12:
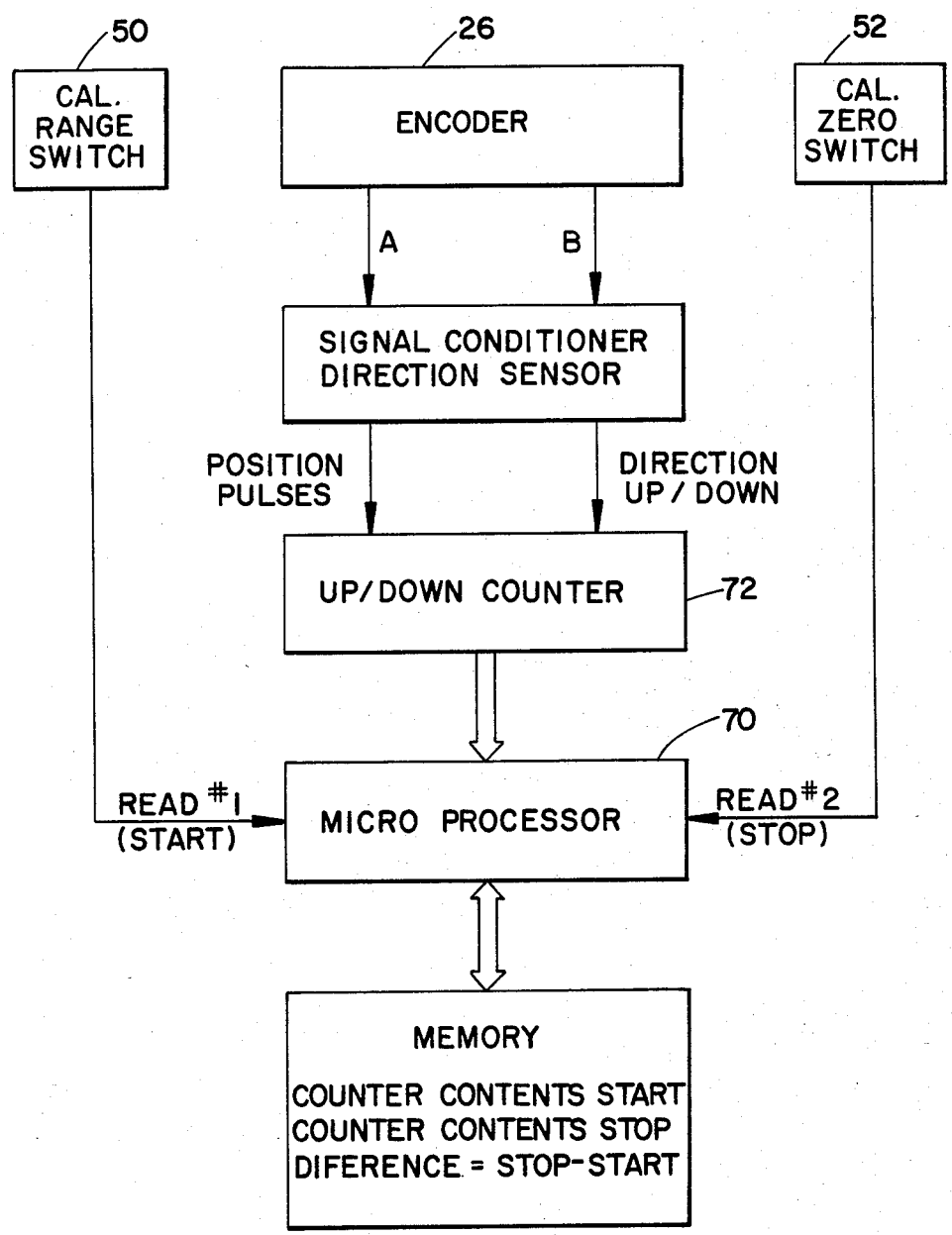
FIG. 12 is a block diagram for the range calibration.

The range and zero calibration cycles can best be understood with reference to FIGS. 11 and 12. For the Y-axis a calibration range switch 150 and a calibration zero switch 152 are also provided. At the beginning of a zero set and calibration cycle, the X-Y table is jogged to a position between the calibration range switches 50, 150 and the calibration zero switches 52, 152. The controller then controls operation of the appropriate servo motors for causing the controlled movable members to go through a calibration and zero cycle for the X-axis and Y-axis. Pushing a reference set button on an input to the controller causes both axes to move outward toward the calibration range switches 50,150. As each switch 50,150 becomes activated, it initiates an approximately two inch point to point move outward beyond the respective calibration range switch 50,150.

Two facts should be noted: (1) an approximately two inch point to point move can be made since an approximate calibration is always known for the components used; and (2) since the range calibration cycle move starts approximately two inches beyond the first switch 50,150 to be triggered 50,150 both the calibration range switches 50,150 and the calibration zero switches 52,152 will be approached from the same direction. This eliminates the chain 20 to pinion 32 backlash during the calibration cycle, resulting in a higher calibration accuracy.

After the fully outward move, each axes now reverses its direction and creeps toward its respective calibration range switch 50,150. As soon as the calibration switch is triggered the second time, a counter 72 in the associate electronic control is activated to receive and store pulses from encoder 26. Also at this time a high speed point to point move toward the respective calibration zero switch 52,152 is initiated. The high speed point to point move is decreased to creep speed for approximately the last one-half inch of travel to trigger the calibration zero switch 52,152 with maximum precision. When the calibration zero switch 52,152 is triggered, any further encoder 26 pulses are blocked from entering the counter circuit which now stores the total number of pulses collected during the travel between the respective calibration range switches 50,150 and the calibration zero switches 52,152. The mechanical distances between the range switch 50,150 and the associated zero switch 52,152 is precisely known. Knowing the distance and the encoder 26 counts a microprocessor 70 now calculates the calibration multiplier for the X-axis and Y-axis encoders. As explained above the separations between the range switch 50,150 and the associated zero switch 52,152 are relatively adjustable so that they can be set to a desired, precise separation.

The X and Y axes continue to move toward their mechanical zero reference position to complete the zero set portion of the cycle. Zero setting of the position indicators to synchronize electrical and mechanical zero is standard and known in the prior art.

Over travel limit switches are provided for limiting movement along the X-axis or Y-axis to prevent machine damage. The over travel limit switches override any position command from the controller and shut down the associated servo drive. Over travel left limit switch 51 and over travel right limit switch 53 prevent movement of cross slide 14 along the X-axis past points where machine damage or mechanical collision could occur. Similarly, over travel out limit switch 151 and over travel in limit switch 153 limit movement of carriage 12 to prevent machine damage. In FIG. 11 an X-axis zero reference is shown at point 54 and a Y-axis zero reference is shown at point 154.

As mentioned above encoder 26 provides three separate pulse outputs, which for a further reference are called A,B and C pulses. The A and B pulses are shifted 90° from each other and arranged such that exactly 1000 A pulses and 1000 B pulses are generated for each one encoder revolution. Also, one C pulse is generated for each encoder 26 revolution. The quadrature A and B pulses are used to indicate the mechanical table position and its direction of travel. The C pulse is used to synchronize, at point 54 for the X-axis and at point 154 for the Y-axis, the mechanical zero position with the electrical zero, where all position counters are zero.

The calibration zero switches 52,152 are positioned approximately one-half of an encoder 26 revolution toward the table center from true mechanical zero position. When, during the range and zero set cycle, the calibration zero switches 52,152 are triggered, this not only completes the range cycle but initiates zeroing by actuating circuitry to receive the C pulse. As the respective axes continue to creep toward mechanical zero 54, 154, the encoder 26 will generate a C pulse when the table has exactly reached the mechanical reference position. The electronic counters are zeroed and sensitized to receive the normal A and B position pulses. The position indicating system has now been synchronized and calibrated.

Suitable chains 20 and pinions 32 are rarely available in pitch size for convenient encoder output. A chain 20 and pinion 32 combination of a slightly higher revolution then required is utilized. The system microprocessor 70 can then multiply the encoder output by the calculated calibration constant to normalize the systems feedback signals.

An advantage of using the range cycle is not only the ease of finding the original constant multiplier, but also the possibility of recalibrating for any possible drifts in the sytem during use. The disclosed linear position indicator can be used for providing the feedback signals for an automatic X-Y positioning table or any linear motion machine. The disclosed indicator is relatively inexpensive. The simplicity of the indicator makes it inherently reliable and easy to implement from standard parts available from stock. Very high speed operations are possible since no resolver to pulse converters are employed to limit speed. Another advantage is that the system microprocessor 70 can automatically adjust for drifts in the system.

I claim:

1. A position indicator for indicating the relative position of two members relatively movable for a predetermined distance in a predetermined direction comprising:
   a length of chain secured at both ends to one of said member to be extended to lie along said predetermined direction for said predetermined distance;
   an encoder secured for movement with the other of said members, said encoder having a rotatable input shaft and including means providing output position information signals in response to rotation of the input shaft;
   a sprocket, connected to said rotatable input shaft, and having peripheral teeth positioned to engage each portion of said length of chain successively to rotate said input shaft during relative movement of the two movable members in said predetermined direction.

2. A position indicator as claimed in claim 1 wherein said sprocket is positioned alongside said length of chain, and further including:
   a pair of rotatable guide idlers having a periphery adapted to engage said chain positions, each of said pair of idlers disposed said sprocket along said predetermined direction, said length of chain extending around each of said idlers into corresponding intermediate spaces between each of said idlers and said sprocket, and thereafter extending around said sprocket.

3. A position indicator as claimed in claim 2 wherein: said each portion of said length of chain engages said sprocket of approximately one half the periphery of said sprocket.

4. A position indicator as claimed in claim 1 further including:
   first detecting means for detecting when said two members reach a first predetermined relative position along said predetermined direction;
   second detecting means, separated from said first detecting means, for detecting when said two relatively movable members reach a second predetermined relative position along said predetermined direction.

5. A position indicator as claimed in claim 4 comprising:
   adjusting means for adjusting the separation of said first detecting means and said second detecting means.

6. A position indicator as claimed in claim 4 wherein said means included in said encoder for providing output information signals produces information pulses corresponding to rotation of said input shaft and further, including:
   a counter operatively connected to said encoder for counting position information pulses from said encoder;
   control means for relatively moving the two movable members between the first and second positions detected by said first detecting means and said second detecting means respectively and for activating said counter as the members move between the first and second positions.

7. A position indicator for indicating relative positioning of a first member movable in a predetermined direction between two spaced apart positions on a second member, comprising:
   a length of chain fixed at both ends on said second member to be extended between the two spaced apart positions generally along said predetermined direction;
   an encoder attached to the first member having a rotatable mechanical input and means providing output signals which are a function of rotation of the mechanical input; and,
   a sprocket, disposed on the mechanical input of said encoder, having a periphery engaging each successive portion of said chain as said first member moves between said two positions and thereby rotating the mechanical input of said encoder as the first member moves relative to the second member.

8. A position indicator as claimed in claim 7 comprising:
   a pair of guide idlers each of said guide idlers having a periphery adapted to engage said chain portions disposed alongside said chain on either side of said sprocket along said predetermined direction with a space therebetween, said chain extending to partially wrap around the periphery of one of said guide idlers and thence through said intermediate space between said one guide idler and said sprocket and passing around one half the periphery said sprocket and thence into the intermediate space between said sprocket and the other guide idler, and thereafter passing about a portion of the other guide idler to extend away generally in said predetermined direction.

9. A position indicator as claimed in claim 7 further including:
a pair of proximity switches, located on the second member in respective positions spaced apart, a predetermined distance along said predetermined direction each of said proximity switches producing a respective detector signal as the first member reaches each of said two positions along said predetermined direction at which each of said proximity switches are located.

10. A position indicator as claimed in claim 9 comprising:
microprocessor means for receiving and storing said signals from said encoder and from said pair of proximity switches and including means calculating a calibration constant, determined upon movement of the members between the positions defined by said pair of spaced apart proximity switches by comparing said encoder signals to said detector signals.

11. A position indicator for indicating the position of a cross slide movable in a predetermined direction across a carriage between two limiting positions comprising:
a length of chain attached at both ends to the carriage to be extended generally along said predetermined direction between two spaced apart points on the carriage;
an encoder attached to said cross slide having a mechanical input, including a rotatable pinion in engagement with said chain; and,
means generating an electrical signal output from said encoder providing position information as a function of rotation of the mechanical input.

12. A position indicator as claimed in claim 11 wherein:
said means generating said electrical signal output from said encoder provides position information in pulse form;
and further including a pair of detectors disposed to sense the presence of said cross slide at two positions located between the limits of movements of said cross slide; and
a counter activated when said cross slide moves between said pair of detectors for counting the number of pulses, indicative of the distance therebetween.

13. A position indicator as claimed in claim 12 including:
means adjustably mounting said detectors whereby the position between said pair of detectors is adjustable to a precise known distance.

14. A position indicator as claimed in claim 12 comprising:
control means for causing said cross slide to move between said pair of detectors and means utilizing the encoder output pulse and the pulses counted by said counter corresponding to said distance between said pair of detectors for calibrating said encoder.

* * * * *